United States Patent [19]

Kaufman et al.

[11] 4,227,486
[45] Oct. 14, 1980

[54] FARROWING PEN

[76] Inventors: Lynn E. Kaufman; Jay S. Kaufman, both of R.R. 1, Moundridge, Kans. 67107

[21] Appl. No.: 966,090

[22] Filed: Dec. 4, 1978

[51] Int. Cl.³ .............................................. A01K 1/00
[52] U.S. Cl. ................................................... 119/28
[58] Field of Search ....................... 119/28, 16, 27, 22, 119/15

[56] References Cited

U.S. PATENT DOCUMENTS

| | | | |
|---|---|---|---|
| 3,137,270 | 6/1964 | Rigterink | 119/28 |
| 3,324,414 | 12/1965 | Conover | 119/28 |
| 3,685,493 | 8/1972 | Weiland, Jr. | 119/28 |

FOREIGN PATENT DOCUMENTS 2273470  1/1976  France ........................................ 119/28

Primary Examiner—Jay N. Eskovitz
Attorney, Agent, or Firm—John H. Widdowson

[57] ABSTRACT

A sanitary animal stall comprising a slatted floor structure, a generally Y-shaped trough communicating with the floor, an overlay mating with said Y-shaped trough. A method of flushing an animal pen comprising confining the animals on a slatted floor; providing a Y-shaped trough structure below and communicating with the floor; and lining the trough with a rigid and discrete overlay wherein the overlay has a very low coefficient of friction such that animal waste moves readily relative to the overlay.

3 Claims, 2 Drawing Figures

FARROWING PEN

BACKGROUND OF THE INVENTION

1. Field of the Invention

This invention is related to a sanitary animal stall. More particularly this invention provides a farrowing pen which is easy to keep clean.

2. History of the Prior Art

U.S. Pat. No. 469,044 by Jungbluth discloses a pavement for stables. U.S. Pat. No. 3,148,663 by Conover teaches a concrete pit monolithic with a floor structure. A floor structure is taught by Kaltenbock in U.S. Pat. No. 3,824,960. None of the features in these patents teach or suggest features of this invention.

SUMMARY OF THE INVENTION

It is therefore an object of this invention to provide a sanitary animal stall or farrowing pen.

It is yet another object of this invention to provide a farrowing pen where manure will not hang on the sides and is economical to install.

Still other objects will be apparent to those skilled in the art from the following description of this invention.

The foregoing objects are achieved according to the practice of this invention. Broadly, this invention comprises a sanitary animal stall or farrowing pen comprising a slatted floor structure for supporting animals, a generally Y-shaped trough disposed below and communicating with the slatted floor, and an overlay generally coextensive and mating with the Y-shaped trough and terminating in proximity to the floor. The overlay has a low coefficient of friction such that manure and other waste generated by the animals are freely movable relative to the overlay. This invention also broadly comprises a method of flushing an animal or farrowing pen comprising the steps of confining the animals on a slatted floor; providing a Y-shaped trough structure below and communicating with the floor; and lining the trough with a rigid and discrete overlay wherein the overlay has a very low coefficient of friction such that animal waste moves readily relative to the overlay.

The advantages and objects of the invention will become evident from the following detailed description when read in conjunction with the accompanying drawings which illustrate the preferred embodiments of the invention.

DETAILED DESCRIPTION OF THE INVENTION

Figure 1:
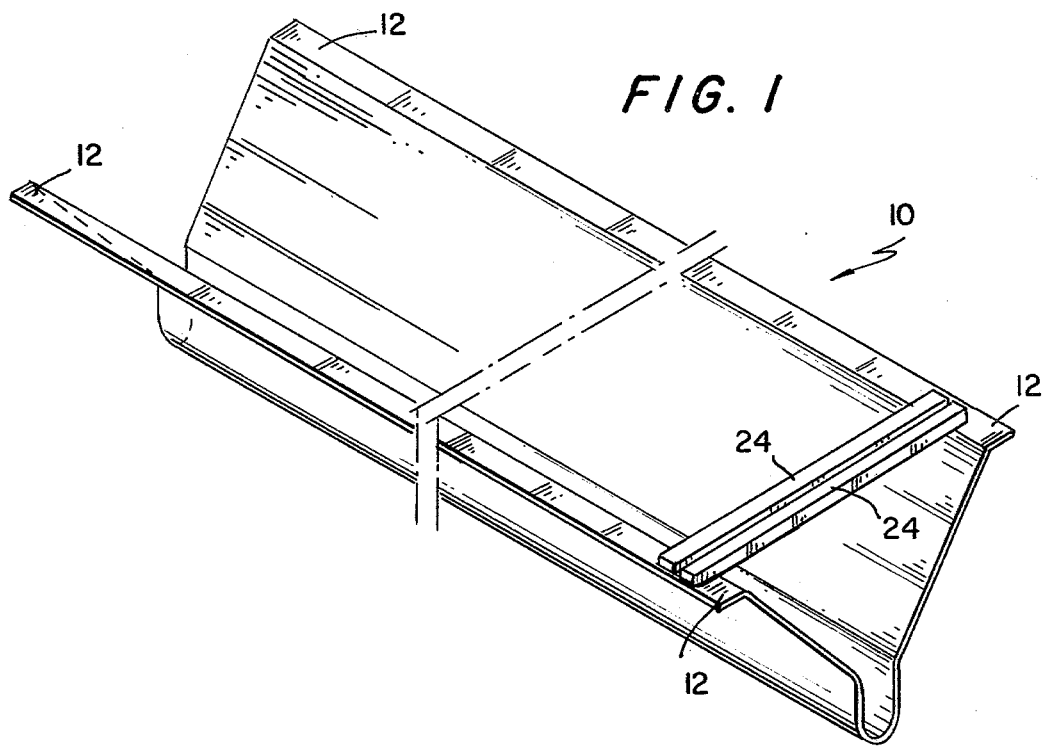
FIG. 1 is a perspective view of the Y-shaped overlay which fits into a trough in the ground.
Figure 2:
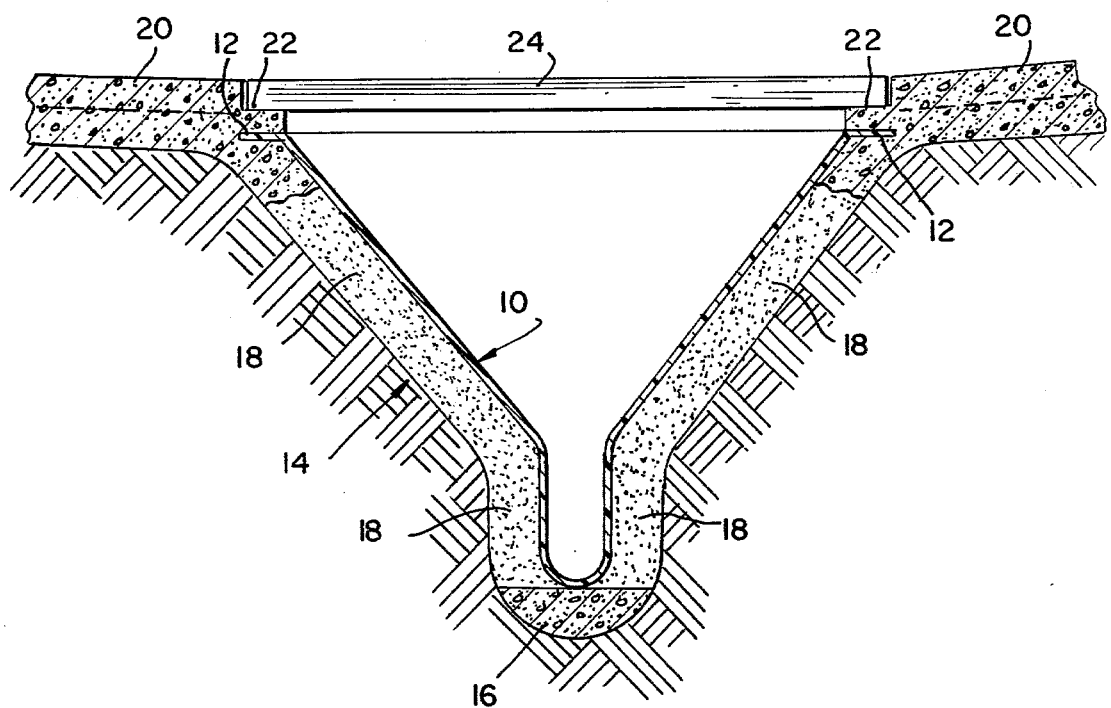
FIG. 2 is a vertical sectional view illustrating the Y-shaped overlay mating with a Y-shaped trough having slatted floors extending from one side to the other side.

With continual reference to the drawing wherein like reference numerals represent similar parts, there is seen a Y-shaped overlay member, generally illustrated as 10, having wings 12. The overlay 10 is preferably an integrally formed member of plastic material reinforced with glass fibers, and has a low coefficient of friction such that manure and other waste generated by the animals are freely movable relative to the overlay 10. Any suitable resin material can be used, and we have found to be desirable such as thermosetting polyester polymers and copolymers, and the like, molded by the usual method of pouring the flowable resin over a form and allowing it to polymerize, cure and harden or by the usual vacuum forming method and apparatus to form a smooth surfaced overlay member. The overlay 10 is coextensive with and mates with a Y-shaped trough, generally illustrated as 14, comprising a concrete footing 16 which supports the overlay 10, and sand backfill 18 (or low cement content or weak concrete mixture) resting on concrete footing 16 and supporting the sides and base of the overlay 10.

It has been discovered that sand backfill 18 should stop between about two inches and nine inches from the top of the Y-shaped trough 14. This is very important in the construction of the invention. Y-shaped trough 14 also includes graded concrete 20 which is poured (and sets) on top of backfill 18 and includes lip 22 for supporting slatted floor 24 that collimates with concrete 20. Wings 12 are embedded in concrete 20.

In operation of the invention, animals are confined on slatted floor 24. Manure and other waste drop through the floor 24 and accumulate in the sump or conduit bottom of Y-shaped overlay 10. The sides of the overlay 10 are relatively steep, most preferably at an angle greater than 40 degrees from the horizontal. The surfaces of the sides of overlay 10 have a low coefficient of friction such that the manure and other waste are freely movable relative to the sides of overlay 10. This low coefficient of friction (such as that of the desired smooth surfaced plastic materials reinforced with glass fibers) also enables the accumulated manure and other animal waste to be flushed out of the system by the normal and usual water in and resulting from the system in use, and not requiring additional water.

Changes may be made in the construction and arrangement of the parts or elements of the embodiment as disclosed herein without departing from the spirit or scope of the invention as defined in the following claims.

We claim:

1. A sanitary animal stall or farrowing pen comprising a slatted floor structure for supporting animals, a generally Y-shaped trough disposed below and communicating with said slatted floor, an overlay having a wing on each side thereof and generally co-extensive and mating with said Y-shaped trough and terminating in proximity to said floor, the surface of said overlay having a low co-efficient of friction such that manure and other waste generated by the animals are freely movable relative to said overlay, said Y-shaped trough comprising a footing supporting said overlay, particulate material supporting the sides of said overlay with said material resting on said footing, and concrete-like material situated in the uppermost section on both sides of said trough with said concrete-like material contiguous to said particulate material and imbedding the wings of said overlay and including a lip for holding said slatted floor, the top of said slatted floor collimating with the top of said concrete-like material.

2. The stall of claim 1 wherein said overlay is an integrally formed and smooth surfaced member of plastic material reinforced with glass fibers.

3. The stall of claim 2 wherein the sides of said overlay from the top thereof are at an angle with the horizontal of at least 40 degrees, and terminate in the lower portion substantially vertical and spaced forming a conduit for waste having an arcuate bottom.

* * * * *